United States Patent
Petrovic

(10) Patent No.: US 8,573,380 B2
(45) Date of Patent: Nov. 5, 2013

(54) ARTICLE ACCUMULATION TABLE FOR A CONVEYOR INSTALLATION

(75) Inventor: Zmaj Petrovic, Octeville-sur-Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 50 days.

(21) Appl. No.: 13/387,057

(22) PCT Filed: Jul. 23, 2010

(86) PCT No.: PCT/FR2010/051565
§ 371 (c)(1),
(2), (4) Date: Jan. 25, 2012

(87) PCT Pub. No.: WO2011/012802
PCT Pub. Date: Feb. 3, 2011

(65) Prior Publication Data
US 2012/0132503 A1    May 31, 2012

(30) Foreign Application Priority Data
Jul. 29, 2009  (FR) .................................... 09 55294

(51) Int. Cl.
*B65G 1/00*    (2006.01)
(52) U.S. Cl.
USPC ...................... 198/347.4; 198/347.1
(58) Field of Classification Search
USPC ......... 198/347.1, 374.4, 367, 457.01, 457.05, 198/580, 599
See application file for complete search history.

(56) References Cited

U.S. PATENT DOCUMENTS

| | | | | |
|---|---|---|---|---|
| 4,359,149 A * | 11/1982 | Erlichman et al. | .......... | 198/347.1 |
| 4,413,724 A * | 11/1983 | Fellner | .......... | 198/594 |
| 6,182,812 B1 * | 2/2001 | Hartness et al. | .......... | 198/364 |
| 6,612,420 B1 * | 9/2003 | Hartness et al. | .......... | 198/597 |
| 6,725,998 B2 * | 4/2004 | Steeber et al. | .......... | 198/347.4 |
| 7,028,830 B2 * | 4/2006 | Beesley et al. | .......... | 198/594 |
| 7,413,072 B2 * | 8/2008 | Horton et al. | .......... | 198/594 |
| 7,926,642 B2 * | 4/2011 | Huttner et al. | .......... | 198/347.1 |
| 8,327,996 B2 * | 12/2012 | Gielniewski et al. | ...... | 198/347.1 |
| 2003/0085103 A1 | 5/2003 | Horton et al. | | |

FOREIGN PATENT DOCUMENTS

| | | |
|---|---|---|
| EP | 1 390 282 | 2/2004 |
| WO | 02/32797 A1 | 4/2002 |
| WO | 02/072454 A1 | 9/2002 |

OTHER PUBLICATIONS

International Search Report of PCT/FR2010/051565 dated Oct. 12, 2010.
French Preliminary Search Report of FR 0955294 dated Mar. 31, 2010.

* cited by examiner

*Primary Examiner* — Gene Crawford
*Assistant Examiner* — Keith R Campbell
(74) *Attorney, Agent, or Firm* — Sughrue Mion, PLLC

(57) ABSTRACT

A planar table for accumulating items for conveying equipment, including: two parallel planar inlet and outlet conveyors that are driven in opposite directions so as to longitudinally move the items. The planar conveyors form an item transit area that has a variable receiving surface, and a diverting member for transferring the items, arranged on the inlet conveyor, to the outlet conveyor. The diverting member is shaped as a curved wall arranged on a longitudinally movable carriage. The wall extends substantially over the entire width of the inlet conveyor, between a side chute and a structure arranged between the two conveyors and on which the carriage is attached. There is an area for feeding items onto the outlet conveyor, the feeding area is arranged outside said transit area.

16 Claims, 5 Drawing Sheets

Figure 1:
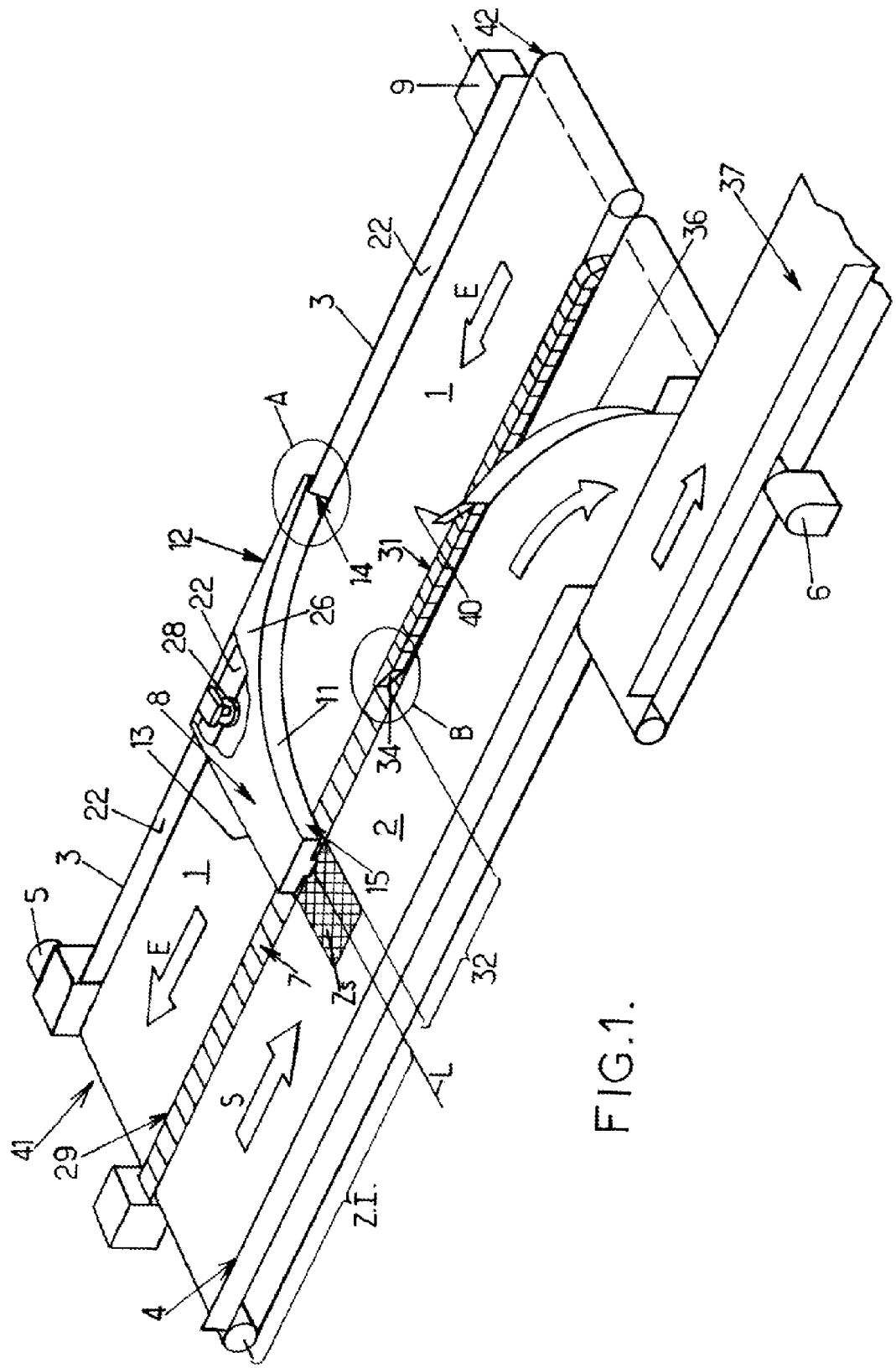

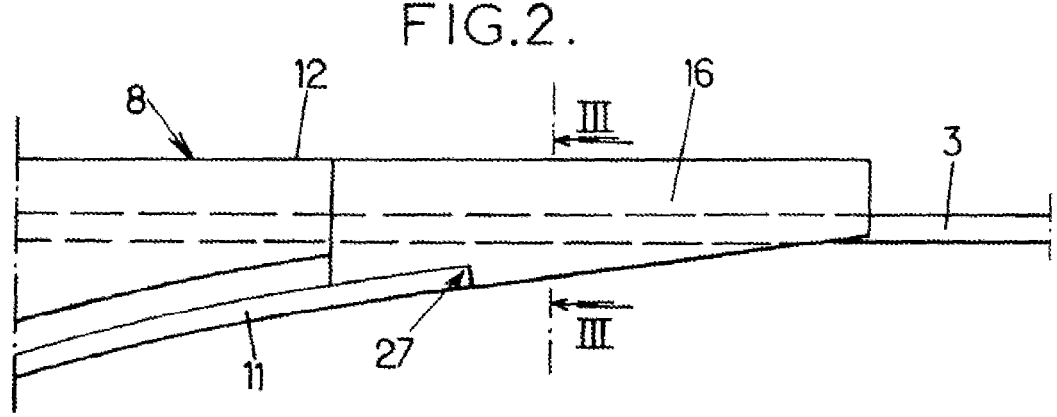
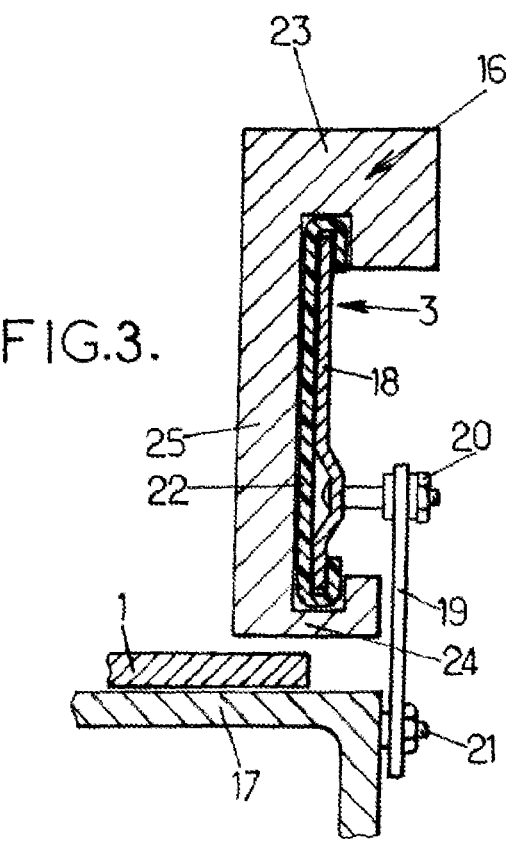

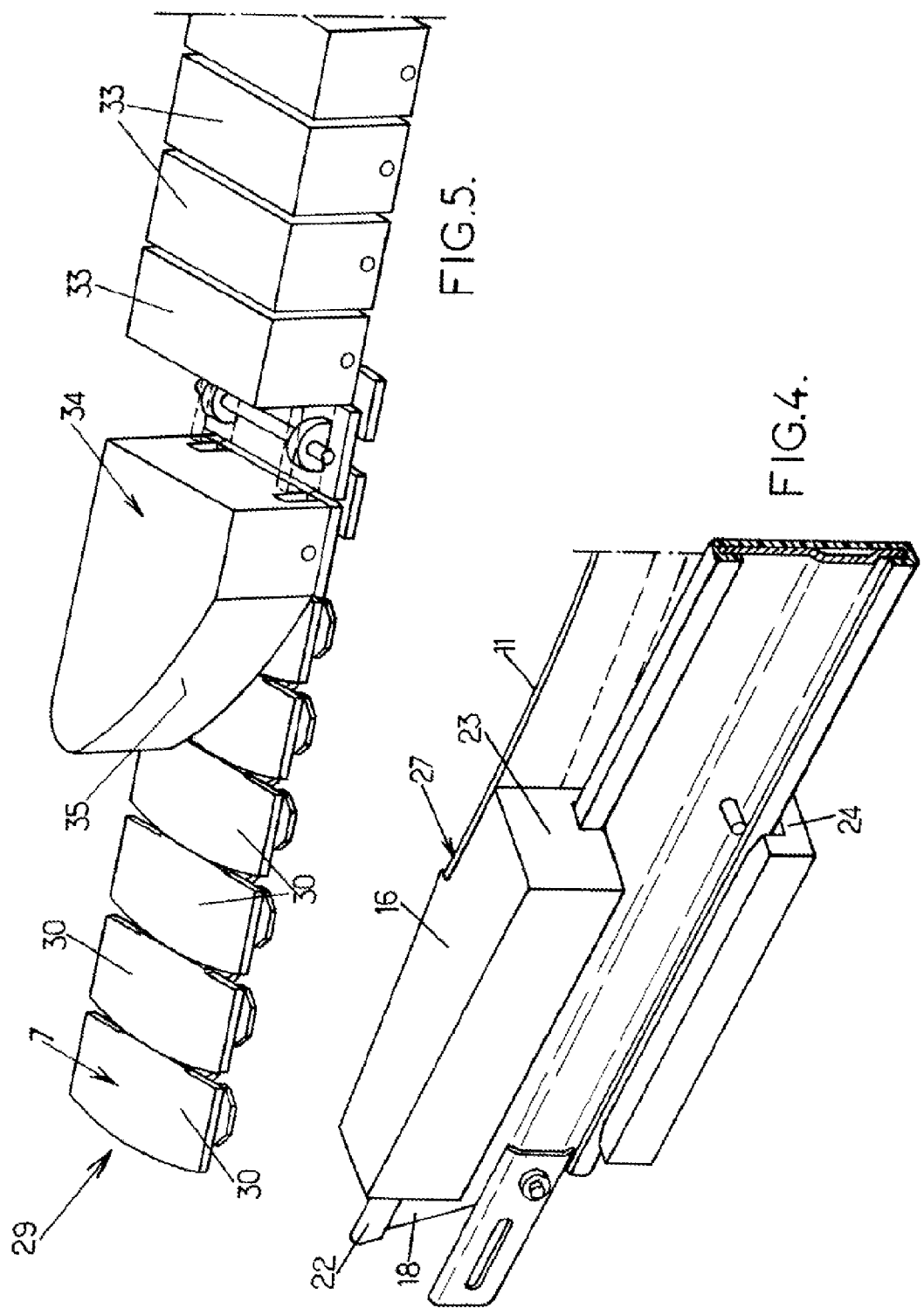

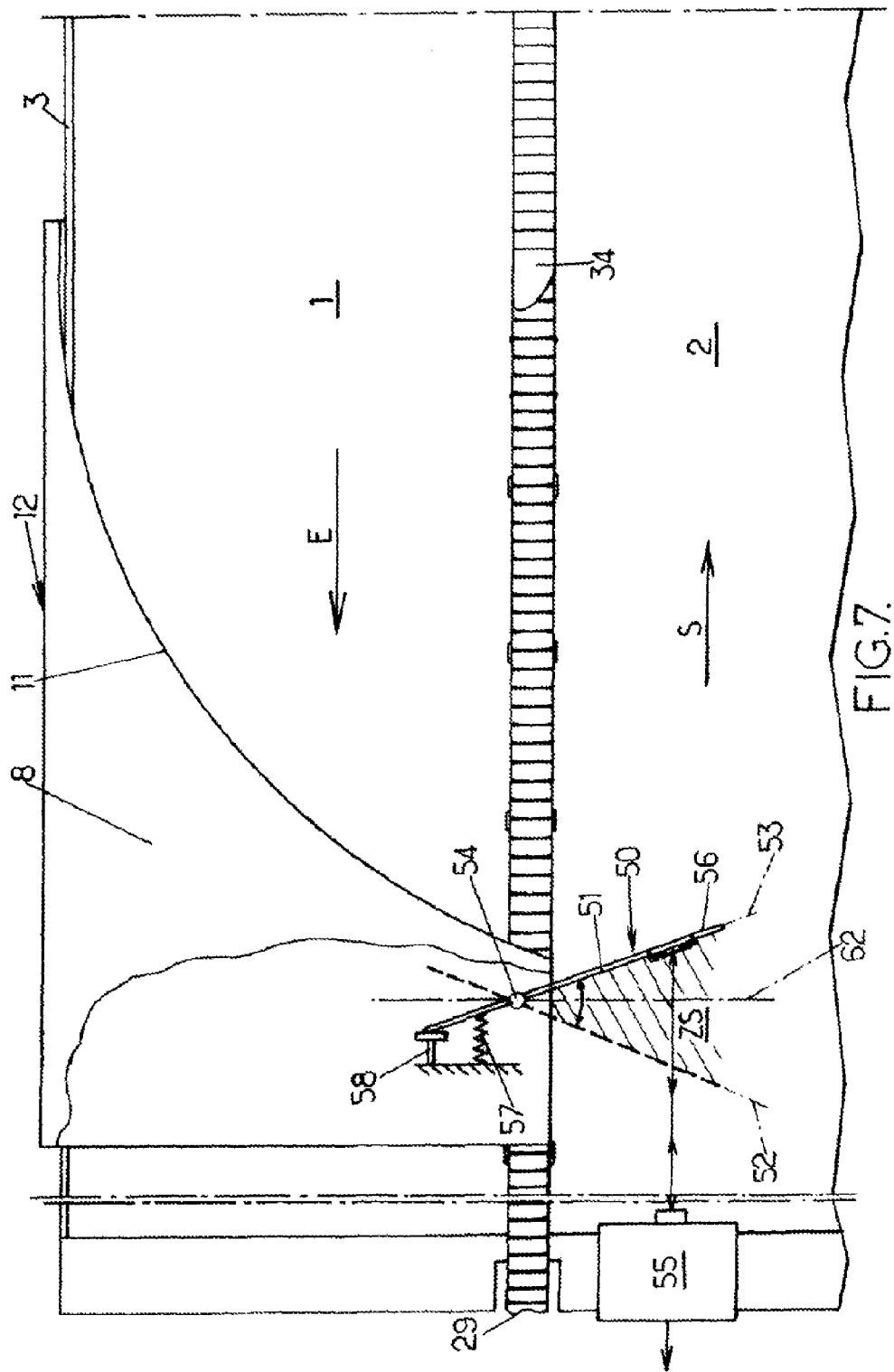

ARTICLE ACCUMULATION TABLE FOR A CONVEYOR INSTALLATION

CROSS REFERENCE TO RELATED APPLICATIONS

This application is a National Stage of International Application No. PCT/FR2010/051565, filed on Jul. 23, 2010, which claims priority from French Patent Application No. 0955294, filed on Jul. 29, 2009, the contents of all of which are incorporated herein by reference in their entirety.

The present invention relates to a table for accumulating articles, such as containers of flask or bottle type, for example, and in particular a table that is incorporated into a conveyor installation.

In production and packaging lines for containers or diverse articles there is a requirement to convey said containers or articles from one station to another or from one machine to another (filling, labeling, etc. type machine).

It is sometimes necessary to accumulate these articles between two stations, to allow a station to be stopped for maintenance, for example, or to allow a change of conveyor speed.

Accumulation tables have therefore been designed, such as that described in application EP 1 390 282, for example.

Such a table comprises two juxtaposed rectilinear plane conveyors, moving in opposite directions, and deflector means that extend at least partly over each of the two conveyors to pass the articles from one conveyor to the other.

The document EP 1 390 282 provides means for moving the deflector means so as to increase the accumulation capacity of the table or, to the contrary, to reduce that accumulation capacity.

Moreover, the deflector means constitute a guide for the streams of bottles and delimit on the accumulation table a transit area between the entry and the exit of said table that offers a capacity for temporary storage of the articles.

This transit area has an area that varies as a function of the movement of the deflector means and the whole of the area of this transit and temporary storage area is occupied by the stream of articles, and in particular by a compact stream.

In fact, the throughput of articles entering onto the accumulation table corresponds to the throughput leaving said table, so that there are no gaps for introducing other articles that may simply be recovered bottles, for example.

To accumulate articles, there exist other types of accumulator that are also constituted of two conveyors that are parallel and move in opposite directions. However, these two conveyors are helical (and wound according to a spiral design) and a carriage guided between the two conveyors carries a deflector member for transferring products from one conveyor to the other.

This type of equipment, as described in the documents U.S. Pat. No. 6,152,291, WO2001/09015, WO2001/98184 and WO2002/32797, includes conveyors that are generally disposed in a protective cage for safety reasons. Moreover, the deflector-carriage moves from floor level up to heights that are sometimes high, following the spiral path that is established by the two conveyors. The protective cage and, most importantly, the design and the operation of this type of equipment rule out envisaging particular introduction of articles onto the exit conveyor for recycling or otherwise.

The invention alleviates this disadvantage and, to this end, provides a plane item accumulation table for a conveyor installation of the type comprising, installed on a frame:

two parallel plane conveyors that are placed side by side and that are driven in opposite directions to cause said articles to circulate longitudinally, one of the conveyors constituting an article entry conveyor and the other conveyor constituting an article exit conveyor, both these conveyors constituting, as a function of requirements, a transit area for accumulation of said articles the receiving area of which is variable, a deflector member that is mobile longitudinally and that transfers said articles disposed on said entry conveyor toward said exit conveyor.

The table of the invention is noteworthy in that the deflector member takes the form of a curved wall that extends over substantially all of the width of the entry conveyor, between a lateral slide serving as a guide for the articles disposed on said entry conveyor and a structure disposed between said two conveyors, which wall is carried by a carriage that is fastened to said structure, which structure is mobile longitudinally. The table of the invention is also noteworthy in that it includes an area for introduction of articles onto said exit conveyor, said introduction area being disposed outside said transit area, on the surface of the conveyor that is situated beyond said deflector member.

The invention may also have the following features, separately or in combination:

the table may include a separator partition that extends between the two conveyors and leaves a passage of constant length upstream of the end of the wall for the transfer of articles from the entry conveyor toward the exit conveyor;

the passage may have a length between substantially once and one and a half times the width of the entry conveyor;

the structure may take the form of an endless chain that is motorized and adapted, notably at the level of the passage, to serve as an intermediate belt between the two conveyors, over a length that corresponds at least to the length of said passage;

the separator partition may be constituted of individual parts that are carried by the belt, which individual parts extend over a length that corresponds to the transit area;

the carriage may comprise:
a lateral side guided on the slide of the entry conveyor,
a transverse side that extends substantially perpendicularly to said slide as far as said structure to which it is fixed,
a curved wall that has an upstream end tangential to said slide and a downstream end at an angle to said transverse side greater than or equal to 10°;

the lateral side of the carriage may include:
an upstream end constituted of a one-piece C-section slider that slides on the slide, said upstream end serving as a point of departure for the curved wall, and
rollers distributed on the lateral side, which rollers are disposed so as to roll on respective opposite sides of the slide;

the slide may comprise a metal core fastened to the frame and a thermoplastic material structural section, which structural section covers said core completely on the conveyor side and partly on the other side;

the table may include a second deflector member adapted to direct the articles that are positioned on the exit conveyor toward another conveyor;

the deflector may include at its upstream end an inclined flap disposed at a level that extends above the partition, said flap being adapted to move the articles toward the exit conveyor when emptying said accumulation table.

Moreover, the invention also provides a table that is equipped with a system for controlling the movement of the deflector member.

For controlling the rate of filling of the table, it is known from EP 1 390 282 to vary the speeds of advance of each of the conveyors, for example by using sensors to monitor the number of articles entering onto the table via the entry conveyor and the number of articles leaving the table via the exit conveyor.

As EP 1 390 282 describes, the deflector member is moved on the table as a function of the speeds of advance of the conveyors.

The invention proposes an alternative way to control the movement of the deflector member.

Thus the invention provides a table as defined above that includes a system for controlling the movement of the deflector member, said system including:

means for detecting the presence or the absence of articles in place in the vicinity of a surveillance area that is situated at the downstream end of the deflector member on the exit conveyor, and means for analyzing information on the occupancy of said area, which information is supplied by said detection means to the analysis means, said analysis means being associated with a computer that controls the means for moving the deflector member to modify the position of said deflector member in one of said directions or the other, according to the occupancy of said surveillance area and depending on whether the detection means reach or overshoot a first or a second position, said first and second positions being situated on respective opposite sides of a reference position and being included within said surveillance area.

According to the invention, the table equipped with such a control system may equally have the following features, separately or in combination:

the detection means may be mobile between two extreme positions delimiting said surveillance area, by a pressure or by an absence of pressure exerted by the articles passing from the entry conveyor toward the exit conveyor;

the detection means may comprise a feeler in the form of an arm articulated to the deflector member, said feeler being positioned so as to be in contact with the conveyed articles and to be mobile as a result of the pressure of said conveyed articles passing from the entry conveyor to the exit conveyor in the surveillance area;

the table may include:
  a first sensor determining the position of the deflector member on the table,
  a second sensor determining the position of said feeler on the table, and
  a computer connected to the first and second position sensors, said computer being adapted to compare data supplied by said first and second sensors to control the means for moving the deflector member;

the feeler position sensor may be a rangefinder and the feeler may carry a reflector;

the detection means may include means for spring-loading the arm into a first detection position.

The invention also provides a method of using the table control system, including the following steps:

the first position sensor sending the computer first information concerning the position of the deflector member on the table, the second position sensor sending the computer second information concerning the position of the feeler on the table, the computer comparing said first and second information to obtain a result, analyzing said result, and the computer sending the means for moving the deflector member an instruction for movement of said deflector member in one direction or another if the result indicates that the feeler has reached either of said triggering positions on one side or the other of said reference position.

The control system defined above could be used on any table comprising:

two parallel rectilinear plane conveyors that are placed side by side and are driven in opposite directions to cause said articles to circulate longitudinally, one of the conveyors constituting an entry conveyor of the articles and the other conveyor constituting an exit conveyor of the articles, both of these conveyors constituting as required a transit and accumulation area for said articles the acceptance area of which may be varied, and a deflector member that is mobile longitudinally in two opposite directions by displacement means, transferring said articles disposed on said entry conveyor to said exit conveyor.

Figure 6:
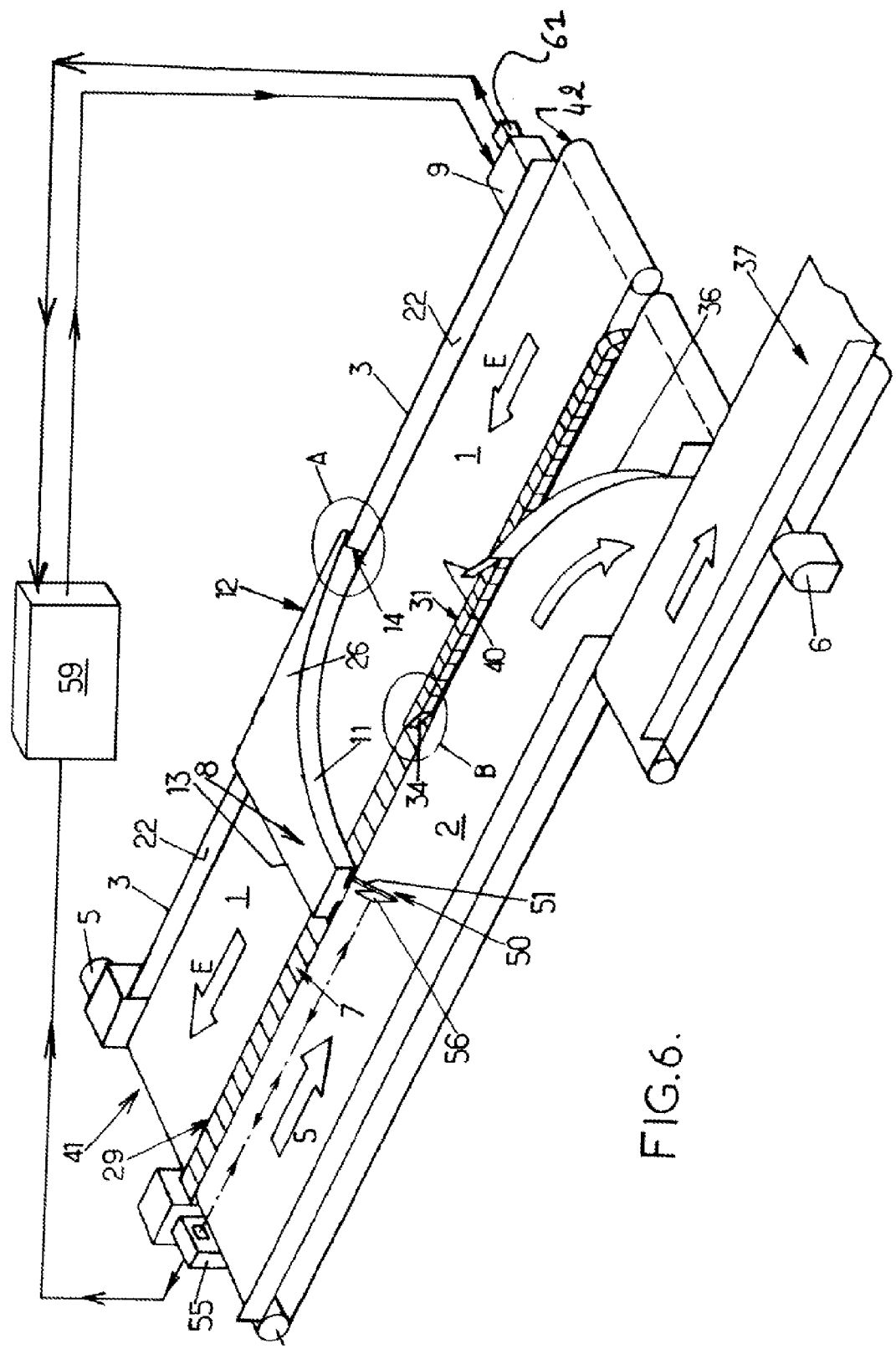

The invention will be better understood in the light of the embodiment described next with reference to the appended drawings, in which:

FIG. 1 is a diagrammatic representation in perspective of an accumulation table of the invention, FIG. 2 shows the end of the carriage, as seen from above, which end is denoted A in FIG. 1, FIG. 3 is a view in section taken along the line III-III in FIG. 2, FIG. 4 is a perspective view of the end of the carriage denoted A in FIG. 1 without the casing, FIG. 5 shows in detail part of the table, denoted B in FIG. 1, FIG. 6 is a diagrammatic representation in perspective of an accumulation table of the invention equipped with a system for controlling the means for moving the deflector member, and FIG. 7 is a diagrammatic plan view of the table from FIG. 6, showing in more detail the elements of the control system.

An embodiment of a plane accumulation table of the invention is described first, and then the mode of operation of such a table.

A plane accumulation table of the invention is shown in FIG. 1.

Such a plane table is designed to be disposed between two processing machines, for example a machine for filling bottles and a machine for packaging bottles (once filled); it is integrated into the conveyor installation that extends between the two machines, in the same horizontal plane.

The plane accumulation table includes two rectilinear conveyors 1 and 2 that are plane and are disposed side by side, parallel to each other.

Each of the conveyors 1 and 2 includes a conveying surface consisting of one or more juxtaposed endless belts.

The conveyor 1 is wider than the conveyor 2.

For example, the conveyor 1 includes ten juxtaposed endless belts and the conveyor 2 includes eight juxtaposed endless belts. To simplify the figures, the multiple belts are not shown.

This arrangement also implies managing the speeds of each conveyor to conform to throughput set points at the input and at the output of the accumulation table, which throughputs are identical at the entry and the exit of said table except during periods of problems at the output.

The belts of the conveyors 1 and 2 enable bottles to be carried and moved between lateral slides 3 and 4. The slide 3 is placed on the edge of the conveyor 1 and the slide 4 on the edge of the conveyor 2.

The conveyor 1 is driven in a forward direction by a motor 5; it constitutes the entry conveyor of the table, because it moves the articles onto the table.

The conveyor 2 constitutes the exit conveyor for the articles, as it evacuates the articles from the accumulation table toward an article packaging machine, for example.

The conveyor 2 is driven in movement in a direction opposite to the direction of movement of the conveyor 1.

The movement of the belt of the conveyor 2 is driven by a motor 6.

In the following description, there will be considered by way of example the conveying of bottles. It must nevertheless be understood that this application is in no way limiting on the invention and that the table of the invention applies to the accumulation of other types of articles.

The bottles are considered to be conveyed longitudinally over the accumulation table by the conveyors 1 and 2, i.e. in the lengthwise direction of the table.

The conveyors 1 and 2 may each constitute a bottle transit area. In fact, it is considered that the bottles arriving on the accumulation table are placed momentarily on the belts of the conveyors 1 and 2 before being evacuated from said table.

To ensure that the bottles pass from the entry conveyor 1 to the exit conveyor 2, the table comprises a deflector member carried by a carriage 8 that is mounted to move longitudinally on the accumulation table.

This carriage 8 is mobile thanks to a structure 7 that is disposed between the two conveyors 1 and 2, and it is guided by the slide 3 situated on the edge of the conveyor 1. The carriage 8 is fastened to the structure 7 which is maneuvered by way of a drive member 9.

The movement of the carriage 8 on the accumulation table enables the area of the bottle transit area, i.e. the area in which the bottles are placed momentarily on said accumulation table before being evacuated, to be increased or reduced; this transit area extends over a receiving area that is constituted by at least part of the entry conveyor 1 and/or the exit conveyor 2.

The carriage 8 is substantially the shape of a right-angle triangle and includes a wall 11 that is curved to guide the bottles disposed on the entry conveyor 1 towards the exit conveyor 2.

This wall 11 serves as a deflector member and extends over the entire width of the entry conveyor 1 between the lateral slide 3 of the entry conveyor 1 and the mobile structure 7, leaving the surface of the conveyor 2 totally free.

The carriage 8 also extends over the entire width of the conveyor 1 to leave free the part of the conveyor 2 that is situated in line with and upstream of said carriage 8 in order to allow manual or mechanical introduction of the bottles onto this free part.

Thus the table of the invention always includes an introduction area that is located on the conveyor 2 upstream of a limit that substantially faces the carriage 8.

This limit is materially defined on the conveyor 2 by a line that corresponds to the front of the bottles, which line is notably visible when the accumulation table is operating when the bottles pass from the conveyor 1 to the conveyor 2.

It may nevertheless be considered that this line may be identified by the reference L (see FIG. 1) when the table is not operating; this line L is abstract and transverse relative to the conveyor 2 and is situated in line with the end of the carriage 8 that is fixed to the structure 7.

The introduction area is denoted ZI in FIG. 1 and it is the position of the carriage 8 on the accumulation table that defines the extent of the available area in this introduction area ZI.

The carriage 8 also has a lateral side 12 that is guided on the slide 3 of the conveyor 1, as described in more detail hereinafter, and a transverse side 13 substantially perpendicular to said slide 3 between the latter and the mobile central structure 7.

The curved wall 11 of the carriage 8 has an upstream end 14 that is tangential to the slide 3 and a downstream end 15 that ends at the mobile structure 7.

At the downstream ends 15 of the curved wall 11, the angle between the tangent to this curved wall 11 and the transverse side 13 is greater than or equal to 10°.

The carriage 8 is mounted to be mobile on the slide 3 as explained next with reference to FIGS. 1 to 4.

Firstly, the carriage 8 includes a part that is mounted to slide on the slide 3. This part constitutes a slider 16 that is fixed to the carriage 8, in particular to the upstream end 14 of the curved wall 11, the upstream end 14 of the curved wall 11 also constituting the upstream end of the lateral side 12.

As may be seen in FIG. 3 in particular, the slide 3 is fixed to the frame 17 of the table. To this end, the slide 3 includes a metal core 18 fixed to a lug 19 by means of a bolt 20, which lug 19 is itself fixed to the frame 17 by a bolt 21.

The slide 3 also includes a thermoplastic material structural section 22 that is threaded over the core 18. This structural section 22 covers the core 18 completely on one of its sides and in particular the side facing toward the entry conveyor 1; the exterior side of the core 18 is simply covered from top to bottom by the ends of said structural section 22 that are bent into a hook shape.

The slider 16 is a part the cross section whereof is substantially C-shaped, comprising two lateral branches 23 and 24 connected by a bottom 25.

The free ends of the lateral branches 23 and 24 are curved toward the interior of the C, so that the slider 16 espouses the contour of the slide 3 that serves as a guide rail for the carriage 8.

The slider 16 is produced in a thermoplastic material which has a low coefficient of friction.

The leading edge of the slider 16 is set back relative to the surface of contact of the bottles on the slide 3 so as to not form a sharp edge and, to the contrary, so as to take up the bottles smoothly and tangentially, to cause them to change direction.

The slider 16 also includes means adapted to be fixed to the structure constituting the carriage 8 which, in FIG. 1, is covered by a protective casing 26 adapted to enclose all of the guide elements of said carriage 8.

The slider 16 also includes a step 27 adapted to receive the end of the wall 11, so that the end of this wall 11 has a surface continuous with the surface of the slider 16.

To guide the carriage 8 along the slide 3, bearing means are provided, distributed along the lateral side 12 of the carriage 8, preferably on respective opposite sides of the slide 3.

Such bearing means may, for example, be constituted of a plurality of rollers distributed along the side 12 of the carriage 8. Some of these rollers are adapted to roll on the structural section 22 of the slide 3 and the others on the core 18 outside said slide.

FIG. 1 shows a roller 28 adapted to roll on the structural section 22. The roller or rollers adapted to roll on the core 18 are intentionally omitted to simplify FIG. 1.

As indicated above, the carriage 8 is fixed to the structure 7 in the vicinity of its downstream end 15, i.e. at the end of the curved wall 11.

This fixing is achieved by means of screws or bolts, for example, or any other means deemed appropriate by the person skilled in the art.

The structure 7 drives the carriage 8 longitudinally; it is constituted of a kind of endless chain and preferably a belt 29 of the same type as those that constitute the conveyors 1 and 2. This endless belt 29 includes links 30 and is driven in a manner that is conventional in itself by a shaft connected to the motor 9.

The links 30 of the endless belt 29 have a surface that coincides with the level of the surface of the belts of the conveyors 1 and 2 so as to serve as a sliding baseplate between these two conveyors and to ensure that the bottles pass smoothly from one to the other.

As FIG. 1 shows, the belt 29 lies in front of the carriage 8, between the conveyors 1 and 2.

In the transit area, the belt 29 carries a partition 31 that extends over a length substantially equal to the length of the conveyors 1 and 2, except over an area the length of which is substantially equal to the length of the lateral side 12 of the carriage 8.

The partition 31 has an end facing the downstream end 15 of the curved wall 11 to leave a passage 32 upstream of the end of said wall 11 for transferring bottles from the conveyor 1 to the conveyor 2.

The partition 31 and the carriage 8 both being fixed to the belt 29, the length of the passage 32 remains constant as said belt 29 moves.

The length of the passage 32 is substantially in the range from 1 to 1.5 times the width of the entry conveyor 1.

To allow the partition 31 to follow the movement of the belt 29, notably in the vicinity of a drive shaft that forces the links 30 to espouse a curved shape, the partition 31 is formed, at least partially, of a succession of identical individual parts 33 that allow this partition 31 to curve. These individual parts 33 are fastened to the links 30 that constitute the belt 29, as FIG. 5 shows, and they form the partition 31 which extends over the length of the transit area.

This allows the partition 31 to be passed at least partly under the accumulation table when its end is in the vicinity of the entry of said table; that entry is indicated in FIG. 1 by the reference 42.

The end 34 of the partition 31, which faces the downstream end of the wall 11 of the deflector carriage 8, is constituted of a part the shape of which recalls that of an off-centre wedge which wedge has an inclined face 35 facing the second or exit conveyor 2.

The function of this inclined face 35 is described hereinafter.

The accumulation table shown in FIG. 1 finally includes a second deflector member 36 that is disposed in the vicinity of the exit from said table, i.e. at the downstream end of the conveyor 2, where the bottles are evacuated.

This deflector 36 is fixedly mounted on the frame 17 of the table by any appropriate known means available to the person skilled in the art and guides bottles on the exit conveyor 2 toward another plane conveyor 37, external to the accumulation table, for example a conveyor 37 that feeds a bottle packaging machine.

The deflector 36 extends over the entire width of the conveyor 2, from the central structure 7 as far as the entry of the conveyor 37.

The deflector 36 is advantageously produced from curved sheet metal the radius of curvature whereof encourages good flow of the bottles, i.e. a flow of the bottles such that they do not collide too much and that they do not fall over when they reach the conveyor 37.

The upstream end of the deflector 36 takes the form of an inclined flap 40 also serving as a deflector, which flap 40 is positioned at a level above that of the partition 31.

This flap 40 is oriented in a direction substantially parallel to that of the inclined face 35 of the part 34 that is situated at the end of the partition 31.

Just like the inclined face 35 of the partition 31, this flap 40 moves onto the exit conveyor 2 bottles stagnating on the belt 29 of the structure 7 when they are pushed by the carriage 8 toward the exit of the accumulation table and in particular toward the conveyor 2 and the deflector 36.

One mode of operation of such a table is described next.

Firstly, the carriage 8 is positioned as close as possible to the entry of the table, so that the flap 40 is substantially in line with the inclined face 35 of the partition 31. In this position, the transit area of the accumulation table is at a minimum.

The bottles arrive on the entry conveyor 1 in the direction of the arrow E, as indicated in FIG. 1.

When the bottles that are placed on the conveyor 1 reach the wall 11 of the carriage 8, they are moved transversely toward the conveyor 2, which transfers them onto the conveyor 37.

The bottles pass from the entry conveyor 1 to the exit conveyor 2 on crossing the passage 32 that lies between the downstream end 15 of the wall 11 and the end 34 of the separator partition 31.

The bottles are then conveyed by the exit conveyor 2, in the direction of the arrow S in FIG. 1, toward the deflector 36. The exit conveyor 2 is then filled with bottles, and in its turn constitutes a bottle transit area.

The carriage 8 is driven in longitudinal movement at a speed of the order of half the speed of the belt of the conveyor 1 when the conveyor 2 is saturated or stopped and the accumulation table must serve as a buffer by storing the bottles.

When the carriage 8 reaches the end of its travel, i.e. is in the vicinity of the end 41 of the table, at the end opposite the bottle entry end 42, the accumulation table is full: the conveyor 1 is full as is the conveyor 2.

During the step of filling the conveyors 1 and 2, other bottles may be introduced manually or mechanically into the introduction area ZI of the conveyor 2, as defined above, outside the transit and accumulation area.

When the accumulation table is empty, the bottles that rest on the belt 29, in the passage 32, are evacuated by the movement of said belt 29 and the carriage 8, in conjunction with the flap 40 which transfers them toward the conveyor 2.

If the bottles are pushed back toward the partition 31, they are redirected toward the conveyor 2, thanks to the inclined face 35 of the partition 31, or thanks to the combined action of the inclined face 35 and the flap 40, if the carriage 8 is positioned so that the inclined face 35 comes into line with the flap 40.

The bottles that arrive at the deflector 36, driven by the conveyor 2, are then directed toward the external conveyor 37.

Technical means may further be provided so that the carriage 8 cannot be placed totally at the end 41 of the accumulation table, but only slightly upstream of that end, so that the introduction area ZI still has a minimum area to enable introduction of bottles at any time.

It is clear from the foregoing description how the invention enables the provision of a transit area and an area for introducing bottles onto the table.

It must nevertheless be understood that the embodiment and the operation that have just been described are not limiting on the invention and that the table could function differently without departing from the scope of the invention.

For example, another table of the invention is described next with reference to FIGS. 6 and 7, said table being equipped with a system for controlling the means for moving the deflector member.

Remember that said movement means are constituted by a motor 9 that drives the endless belt 29 to which are fixed diverse elements, including the carriage 8, the carriage 8 carrying the deflector member 11.

The table shown in FIG. 6 comprises all the elements of that described and shown in FIGS. 1 to 5. Thus the same references have been kept for the common elements.

The control system described next reacts to the occupancy of an area called the controlled or "surveillance" area ZS, which is defined on the exit conveyor 2.

This area ZS is shown diagrammatically in FIGS. 1 and 7 by a cross-hatched area.

The surveillance area ZS is at the downstream end 15 of the deflector member 11, on the exit conveyor 2.

To control the occupancy of this controlled area ZS by the articles, the control means include means 50 for detecting the presence or the absence of articles.

These detection means 50 comprise an arm 51 articulated on the carriage 8, mobile between two positions 52 and 53 that delimit the surveillance area ZS.

As shown in FIG. 7, the arm 51 is mounted so as to pivot about a vertical shaft 54 situated on the carriage 8 near its downstream end. The surveillance area ZS thus has an angular sector shape.

It must nevertheless be understood that the invention is not limited to the surveillance of an area of this shape and that it could be used for the surveillance of a rectangular area, for example, as shown in FIG. 1, without departing from the scope of the invention.

As FIG. 7 shows, in the vicinity of one end of the arm 51, the end that is on the carriage 8 is connected to the chassis of the carriage 8 by a tension spring 57.

The spring 57 constitutes means for spring-loading the arm 51 into a first detection position.

The end of the arm 51, at the spring 57 end, rests on an abutment 58 that is fixed relative to the carriage 8.

The other end of the arm 51, which pivots above the exit conveyor 2, constitutes a kind of feeler against which the conveyed articles may exert a pressure. By exerting a pressure on the arm 51, the articles move the arm 51 into the surveillance area ZS.

The presence or absence of articles in the area ZS is detectable by the position adopted by the arm 51 on the exit conveyor 2 in the surveillance area ZS.

This position is computed by a rangefinder 55 that constitutes a sensor adapted to determine the position of the arm 51 on the exit conveyor 2, which arm includes a reflector 56.

The rangefinder 55 is advantageously disposed at the end of the table, as FIGS. 6 and 7 show.

The reflector 56 offers the advantage of enabling a light beam to be reflected toward the rangefinder 55 regardless of the color of the bottles.

In fact, some bottles are a color that does not reflect the light beam emitted by the rangefinder. Others are produced in materials that do not reflect the light beam emitted by the rangefinder either.

It thus suffices to choose the color of the reflector 56 as a function of the beam emitted by the rangefinder 55 for the detection means to function independently of the color of the articles conveyed.

As a function of the position of the reflector 56 in the surveillance area ZS, the rangefinder generates information (illustrated by the arrows) that it transmits to analysis means described next.

The analysis means are associated with a computer 59 that is fixed to the table.

The computer 59 has not been as shown to the table to simplify FIG. 6.

The computer 59 is adapted to control the operation of the motor 9 to modify the position of the carriage 8 on the table as a function of information that it receives from the rangefinder 55.

Operation of the motor 9 drives movement of the carriage 8 in one direction or the other over the table to increase or decrease the transit area for the conveyed articles on the table.

The computer 59 controls the operation of the motor 9 by comparing the information that it receives from the rangefinder 55 with other information (illustrated by the arrows in FIG. 6) sent to it by another sensor 61.

The sensor 61 is a pulse generator that is fixed to the shaft of the motor 9. This pulse generator enables the position of the carriage 8 on the table to be transmitted to the computer 59 continuously.

To be more precise, the pulse generator 61 gives a geographical indication of a reference position 62, the reference position 62 being situated in the surveillance area ZS.

In the embodiment shown in FIGS. 6 and 7, the reference position 62 is constituted by a line that passes through the shaft 54 and is perpendicular to the longitudinal axis of the table, i.e. the axis of movement of the carriage 8. This line is constituted by the bisector of the maximum angle swept by the arm 51, the reference position being situated halfway between the two extreme positions 52 and 53 that the arm 51 may assume.

The information provided by the rangefinder 55 and by the pulse generator 61 is compared by the computer 59 to obtain a result.

That result provides information as to the position of the reflector 56 relative to the reference position materialized by the line 62.

The computer 59 stores two values (a minimum value and a maximum value) respectively corresponding to two positions situated on respective opposite sides of the reference position materialized by the line 62.

The computer 59 analyzes the result with reference to the two stored values.

The result obtained by the computer 59 must lie between these two values for no information to be sent to the motor 9 of the carriage 8. In other words, if the result is between the two values stored in the computer 59 beforehand, the carriage 8 does not move on the table.

On the other hand, if the result is greater than the maximum value or less than the minimum value, then the computer 59 sends the drive means (the motor 9) an instruction to move the carriage 8 one way or the other.

Thus if the table is overloaded with articles, they push the arm 51 far enough for it to reach a position capable of triggering an instruction to move the carriage 8.

In parallel with this, if there is no article on the table, or too few articles, the arm 51 is oriented toward an extreme position in the surveillance area, which triggers movement of the carriage 8.

It is clear from the foregoing description how the table equipped with a control system as described above enables the carriage 8 to be moved automatically as soon as the system detects an excessive or insufficient quantity of articles in a surveillance area downstream of the deflector member.

It must be understood that the invention is not limited to this embodiment, and that it covers any table equipped with means equivalent to those described above.

The invention claimed is:

1. A plane item accumulation table for a conveyor installation configured to be installed on a frame, comprising:
   two parallel plane conveyors that are placed side by side and that are driven in opposite directions to cause said articles to circulate longitudinally, one of the conveyors is an article entry conveyor and the other conveyor is an article exit conveyor, both conveyors forming, as a function of requirements, a transit area for accumulation of said articles the receiving area of which is variable, a deflector member that is mobile longitudinally and that transfers said articles disposed on said entry conveyor toward said exit conveyor, wherein said deflector member takes the form of a curved wall that extends over substantially all of the width of the entry conveyor, between a lateral slide serving as a guide for the articles disposed on said entry conveyor and a structure disposed between said two conveyors, which wall is carried by a carriage that is fastened to said structure, which structure is mobile longitudinally, said accumulation table including an introduction area for introduction of articles onto said exit conveyor, said introduction area being disposed outside said transit area, said accumulation table comprising a control system for means for moving said deflector member, said control system including:

means for detecting the presence or the absence of articles in place in the vicinity of a surveillance area that is situated at the downstream end of the deflector member on the exit conveyor, and means for analyzing information on the occupancy of said surveillance area, which information is supplied by said detection means to the analysis means, said analysis means being associated with a computer that controls the means for moving the deflector member to modify the position of said deflector member in one of said directions or the other, according to the occupancy of said surveillance area and depending on whether the detection means reach or overshoot a first or a second position, said first and second positions being situated on respective opposite sides of a reference position and being included within said surveillance area.

2. The accumulation table as claimed in claim 1, wherein the detection means are mobile between two extreme positions delimiting said surveillance area, by a pressure or by an absence of pressure exerted by the articles passing from the entry conveyor toward the exit conveyor.

3. The accumulation table as claimed in claim 2, wherein the detection means comprise a feeler in the form of an arm articulated to the deflector member, said feeler being positioned so as to be in contact with the conveyed articles and to be mobile as a result of the pressure of said conveyed articles passing from the entry conveyor to the exit conveyor in the surveillance area.

4. The accumulation table as claimed in claim 3, comprising:

a first sensor determining the position of the deflector member on the table, a second sensor determining the position of said feeler on the table, and a computer connected to the first and second position sensors, said computer being adapted to compare data supplied by said first and second sensors to control the means for moving the deflector member.

5. The accumulation table as claimed in claim 4, wherein the feeler position sensor is a rangefinder and in that the feeler carries a reflector.

6. The accumulation table according to claim 3, wherein the detection means comprises means for spring-loading the arm into a first detection position.

7. The accumulation table according to claim 1, comprising a separator partition that extends between the two conveyors and leaves a passage of constant length upstream of the end of the wall for the transfer of articles from the entry conveyor toward the exit conveyor.

8. The accumulation table as claimed in claim 7, wherein the passage has a length between substantially once and one and a half times the width of the entry conveyor.

9. The accumulation table as claimed in claim 7, wherein the structure takes the form of an endless chain that is motorized and adapted, notably at the level of the passage, to serve as an intermediate belt between the two conveyors, over a length that corresponds at least to the length of said passage.

10. The accumulation table as claimed in claim 9, wherein the separator partition is constituted of individual parts that are carried by the belt, which individual parts extend over a length that corresponds to the transit area.

11. The accumulation table as claimed in claim 1, wherein the carriage comprises:

a lateral side guided on the slide of the entry conveyor, a transverse side that extends substantially perpendicularly to said slide as far as said structure to which said carriage is fixed, a curved wall that has an upstream end tangential to said slide and a downstream end at an angle to said transverse side greater than or equal to 10°.

12. The accumulation table as claimed in claim 11, wherein the lateral side of the carriage comprises:

an upstream end constituted of a one-piece C-section slider that slides on the slide, said upstream end serving as a point of departure for the curved wall, and rollers distributed on the lateral side, which rollers are disposed so as to roll on respective opposite sides of the slide.

13. The accumulation table as claimed in claim 12, wherein the slide comprises a metal core fastened to the frame and a thermoplastic material structural section, which structural section covers said core completely on the conveyor side and partly on the other side.

14. The accumulation table as claimed in claim 1, comprising a second deflector member adapted to direct the articles that are positioned on the exit conveyor toward another conveyor.

15. The accumulation table according to claim 1, said accumulation table comprising a second deflector member adapted to direct the articles that are positioned on the exit conveyor toward another conveyor, wherein the detection means are mobile between two extreme positions delimiting said surveillance area, by a pressure or by an absence of pressure exerted by the articles passing from the entry conveyor toward the exit conveyor, and wherein the deflector includes, at its upstream end, an inclined flap disposed at a level that extends above the partition, said flap being adapted to move the articles toward the exit conveyor when emptying said accumulation table.

16. A method of using a control system of a plane item accumulation table for a conveyor installation configured to be installed on a frame, wherein the table comprises: two parallel plane conveyors disposed side by side and configured to be driven in opposite directions to cause said articles to circulate longitudinally, one of the conveyors is an article entry conveyor and the other conveyor is an article exit conveyor, both conveyors forming, as a function of requirements, a transit area for accumulation of said articles the receiving area of which is variable; a deflector member that is mobile longitudinally and that transfers said articles disposed on said entry conveyor toward said exit conveyor, wherein said deflector member takes the form of a curved wall that extends over substantially all of the width of the entry conveyor, between a lateral slide serving as a guide for the articles disposed on said entry conveyor and a structure disposed between said two conveyors, which wall is carried by a carriage that is fastened to said structure which is mobile longitudinally; and an introduction area for introduction of articles onto said exit conveyor, said introduction area being disposed outside said transit area; a control system for means for moving said deflector member, said control system including: means for detecting the presence or the absence of articles in place in the vicinity of a surveillance area that is situated at the downstream end of the deflector member on the exit conveyor, and means for analyzing information on the occupancy of said surveillance area, which information is supplied by said detection means to the analysis means, said analysis means being associated with a computer that controls the means for moving the deflector member to modify the position of said deflector member in one of said directions or the other, according to the occupancy of said surveillance area and depending on whether the detection means reach or overshoot a first or a second position, said first and second positions being situated on respective opposite sides of a reference position and being included within said surveillance area, wherein the detection means are mobile between two extreme positions delimiting said surveillance area, by a pressure or by an absence of pressure exerted by the articles passing from the entry conveyor toward the exit conveyor, wherein the detection means comprise a feeler in the form of an arm articulated to the deflector member, said feeler being positioned so as to be in contact with the conveyed articles and to be mobile as a result of the pressure of said conveyed articles passing from the entry conveyor to the exit conveyor in the surveillance area, comprising: a first sensor determining the position of the deflector member on the table, a second sensor determining the position of said feeler on the table, and a computer connected to the first and second position sensors, said computer being adapted to compare data supplied by said first and second sensors to control the means for moving the deflector member, said method comprising the steps of:

- the first position sensor sending the computer first information concerning the position of the deflector member on the table,
- the second position sensor sending the computer second information concerning the position of the feeler on the table,
- the computer comparing said first and second information to obtain a result,
- analyzing said result, and
- the computer sending the means for moving the deflector member an instruction for movement of said deflector member in one direction or another if the result indicates that the feeler has reached either of said triggering positions on one side or the other of said reference position.

* * * * *